US012790186B2

(12) United States Patent
Hostetter et al.

(10) Patent No.: US 12,790,186 B2
(45) Date of Patent: Nov. 10, 2026

(54) JACK ASSEMBLY AND SERVICE ACCESSORY FOR SAME

(71) Applicant: Bloomfield Manufacturing Co., Inc., Bloomfield, IN (US)

(72) Inventors: Robbie D. Hostetter, Bloomfield, IN (US); E. Austin Harrah, Bloomfield, IN (US)

(73) Assignee: Bloomfield Manufacturing Co., Inc., Bloomfield, IN (US)

( * ) Notice: Subject to any disclaimer, the term of this patent is extended or adjusted under 35 U.S.C. 154(b) by 458 days.

(21) Appl. No.: 18/239,183

(22) Filed: Aug. 29, 2023

(65) Prior Publication Data

US 2025/0074752 A1 Mar. 6, 2025

(51) Int. Cl.
*B66F 1/06* (2006.01)

(52) U.S. Cl.
CPC .................................... *B66F 1/06* (2013.01)

(58) Field of Classification Search
CPC ...... B66F 1/06; B66F 1/02; B66F 3/02; B66F 7/28; B66F 9/02; B66F 2700/02; B66F 2700/025; B66F 13/00; B66F 11/00; Y10S 254/04; B60S 11/00; B60P 3/125
USPC ..................... 254/108, 111, 112, 133 R, 134
See application file for complete search history.

(56) References Cited

U.S. PATENT DOCUMENTS

| | | | | |
|---|---|---|---|---|
| 1,104,328 | A | 7/1914 | Sutton | |
| D248,460 | S | 7/1978 | Dunn | |
| 4,379,546 | A * | 4/1983 | McIntosh | B66F 1/06 254/111 |
| 4,616,970 | A * | 10/1986 | Lewis | B60P 3/125 414/800 |
| 6,695,290 | B1 * | 2/2004 | O'Connell | B66F 1/06 254/133 R |
| D532,576 | S | 11/2006 | Simpson et al. | |
| 11,904,818 | B2 * | 2/2024 | Hillier | B66F 1/02 |
| 2013/0099086 | A1 | 4/2013 | Jevne | |

FOREIGN PATENT DOCUMENTS

FR 2936238 B1 3/2013

* cited by examiner

*Primary Examiner* — Brian D Keller
*Assistant Examiner* — Sidney D Full
(74) *Attorney, Agent, or Firm* — Brannon Sowers & Cracraft PC

(57) ABSTRACT

A jack assembly includes a jack, and a service accessory including a plurality of different working surfaces defining a plurality of different service orientations. The service accessory includes a first elongate guide structured to mate the service accessory to the jack beam in a first assembly configuration presenting some of the working surfaces at first service orientations relative to a jack beam, and a second elongate guide structured to mate the service accessory in a second assembly configuration presenting some of the working surfaces at second service orientations relative to the jack beam.

13 Claims, 5 Drawing Sheets

JACK ASSEMBLY AND SERVICE ACCESSORY FOR SAME

TECHNICAL FIELD

The present disclosure relates generally to the field of jacks, and more particularly to a service accessory for a jack positionable in different assembly configurations for use of different working surfaces of the service accessory.

BACKGROUND

Mechanical jacks have been well-known and used throughout the world for well over a century. Scissor jacks for automotive applications, hydraulic jacks for manufacturing and service of machinery are used in all countries of the world in virtually innumerable applications. So-called high lift jacks have also been employed across a variety of industries and used by a diverse customer base for many years, including in agriculture and other off-highway environments to name some examples.

High lift jacks have been traditionally employed by workers principally to lift and free stuck or trapped machinery or machines that have broken down or experienced flat tires and the like. In recent years, such jacks have been increasingly used in the recreational off-highway industry not only to lift equipment but also for winching applications, and in some instances by safety, rescue, and firefighting personnel.

Engineers have long sought to improve the operation and functionality of high lift jacks and related equipment. Research and development in this field has also revealed the desirability of increased flexibility in the use and application of high lift jacks, including for purposes such as clamping, spreading, and still others. One example of an adapter apparently for expanding service applications for a high lift jack is known from U.S. Design Pat. No. D532,576 to Simpson et al.

SUMMARY

In one aspect, a jack assembly includes a base, a beam including therein a plurality of apertures spaced vertically between a first beam end coupled to the base, and a second beam end, and a runner assembly. The runner assembly includes climbing elements selectively positionable in the plurality of apertures, and an actuator for varying a position of the runner assembly vertically upon the beam. The jack assembly further includes a service accessory having a plurality of working surfaces and a beam fastening opening formed therein. The service accessory further includes a first elongate guide structured to mate the service accessory to the beam in a first assembly configuration presenting some of the plurality of working surfaces at first service orientations relative to the beam, and a second elongate guide structured to mate the service accessory to the beam in a second assembly configuration presenting some of the plurality of working surfaces at second service orientations relative to the beam.

In another aspect, a service accessory for a jack includes a one-piece accessory body having an outer peripheral surface varied in contour so as to form a plurality of outer working surfaces, and at least one inner peripheral surface forming a beam fastening opening and a plurality of inner working surfaces. The one-piece accessory body further includes a first longitudinal end, a second longitudinal end, and a first elongate guide extending longitudinally between the first longitudinal end and the second longitudinal end. The one-piece accessory body further includes a first transverse end, a second transverse end, and a second elongate guide extending transversely between the first transverse end and the second transverse end. The plurality of inner working surfaces have a distribution in at least one of a longitudinal direction or a transverse direction, and the plurality of outer working surfaces among them define at least one service orientation in the longitudinal direction and at least one service orientation in the transverse direction.

In still another aspect, a service accessory for a jack includes an accessory body having a first longitudinal end, a second longitudinal end, a first transverse end, a second transverse end, a first side, a second side, and at least one hole extending through the accessory body from the first side to the second side. The accessory body further includes a first outer working surface defining a service orientation in a longitudinal direction, and a second outer working surface defining a service orientation in a transverse direction. The accessory body further includes a longitudinal set of guide channels formed in one of the first side or the second side and a transverse set of guide channels formed in one of the first side or the second side.

DETAILED DESCRIPTION

Figure 1:
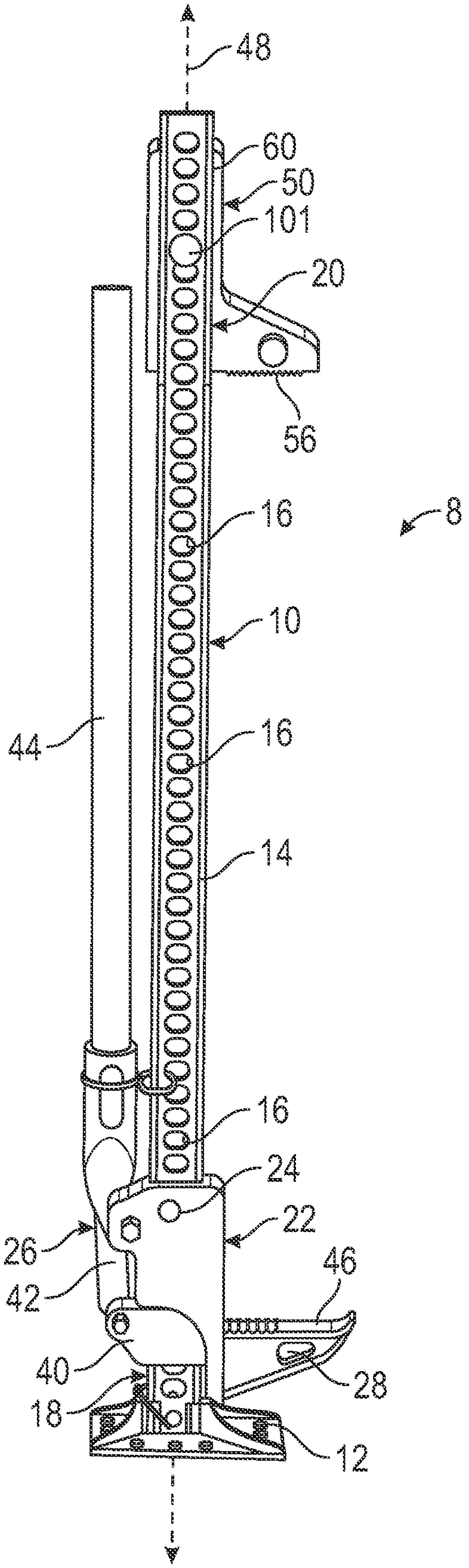
FIG. 1 is a diagrammatic view of a jack assembly, according to one embodiment.

Referring to FIG. 1, there is shown a jack assembly 8, according to one embodiment. Jack assembly 8 includes a jack 10 having a base 12, and a standard or beam 14 including therein a plurality of apertures 16 spaced vertically between a first beam end 18 coupled to and supported in base 12, and a second beam end 20. Beam 14 defines a vertical axis 48. Jack 10 also includes a runner assembly 22 having climbing elements 24 selectively positionable in the plurality of apertures 16. Climbing elements 24 may have the form of spring-biased climbing pins in an embodiment. One climbing element 24 is visible in FIG. 1 and it will be understood that another climbing element would be visible from an opposite side of jack 20. Runner assembly 22 also includes an actuator 26 for varying a position of runner assembly 22 vertically upon beam 14. Runner assembly 22 may include a large runner 28, a small runner 40 vertically below large runner 28, and actuator 26 may include a pitman 42 coupled to a handle 44.

The components and operation of runner assembly 22 may be of conventional design including that known from a variety of so-called Hi-lift® jacks commercially available from Hi-Lift Jack Company of Bloomfield, Indiana, the assignee of the present patent application. Large runner 28 may include a lifting nose 46 facing a vertically upward direction to engage with an article to be lifted, or in other instances spread, clamped, or winched. It is contemplated that jack assembly 8 may be used in a wide variety of applications, including for lifting of stuck or stranded vehicles such as tractors, trucks, and off-road recreational vehicles. Jack assembly 28 may also be used in connection with winching of such vehicles, or winching of other types of objects and articles altogether such as fallen trees. Jack assembly 8 may also be used in clamping and spreading applications without limitation, including for example in construction applications and for vehicle rescues. Those skilled in the art will envision a wide variety of applications for jack assembly 8, particularly in view of the following description.

Jack assembly 8 further includes a service accessory 50. Service accessory 50 may be positioned upon beam 14 in a plurality of different assembly configurations each providing different service orientations of at least some of a plurality of working surfaces as further discussed herein. Referring also now to FIGS. 2-7, service accessory 50 includes a one-piece body 52. Body 52 may include a casting, a forging, or potentially even an article produced by additive manufacturing in some instances. Accessory body 52 includes an outer peripheral service 54 varied in contour so as to form a plurality of outer working surfaces 56, 58, 60, and at least one inner peripheral surface 62. The at least one inner peripheral surface 62 forms a beam fastening opening 64 structured to receive a fastener such as a bolt or pin that is received in a suitable opening formed in beam 14. The at least one inner peripheral surface 62 further forms a plurality of inner working surfaces 66, 68, 70, 72. Body 52 also includes a first side 74, best seen in FIG. 2 and an opposite second side 76 best seen in FIG. 3. Second side 76 may include a substantially planar surface 110 extending to a peripheral wall 112. Beam fastening opening 64 and other holes through accessory body 52 may extend from first side 74 to second side 76.

Accessory body 52 further includes a first longitudinal end 78, a second longitudinal end 80, and a first elongate guide 82 extending longitudinally between first longitudinal end 78 and second longitudinal end 80 and structured to mate service accessory 50 to beam 14 in a first assembly configuration. Accessory body 52 further includes a first transverse end 88, a second transverse end 90, and a second elongate guide 92 extending transversely between first transverse end 88 and second transverse end 90 and structured to mate service accessory 50 to beam 14 in a second assembly configuration. Accessory body 52 defines a longitudinal axis 98 extending between first longitudinal end 78 and second longitudinal end 80 and defining a longitudinal direction. Accessory body 52 further defines a transverse axis 100 extending between first transverse end 88 and second transverse end 90 and defining a transverse direction. As discussed herein, a longitudinal direction may include a first longitudinal direction such as a direction toward a first longitudinal end 78 as well as a second longitudinal direction such as a direction toward second longitudinal end 80. An analogous convention can be applied respecting a transverse direction.

The plurality of inner working surfaces 66, 68, 70, 72 may have a distribution in at least one of a longitudinal direction or a transverse direction. The plurality of outer working surfaces 56, 58, 60, among them define at least one service orientation in the longitudinal direction and at least one service orientation in the transverse direction. A service orientation may mean directly or indirectly facing a longitudinal or a transverse direction, such as a working surface facing the subject direction. A service orientation might also mean directly or indirectly opening toward the subject direction. Thus, a cutout that opens in the longitudinal direction defines a service orientation in that longitudinal direction.

Mating service accessory 50 to beam 14 in a first assembly configuration presents some of the plurality of outer working surfaces 56, 58, 60 and/or some of the plurality of inner working surfaces 66, 68, 70, 72 at first service orientations relative to beam 14. Mating service accessory 50 to beam 14 in the second assembly configuration presents at least some of the respective working surfaces at second service orientations relative to beam 14. The meaning and importance of the different service orientations will be further apparent from additional description herein.

Figure 2:
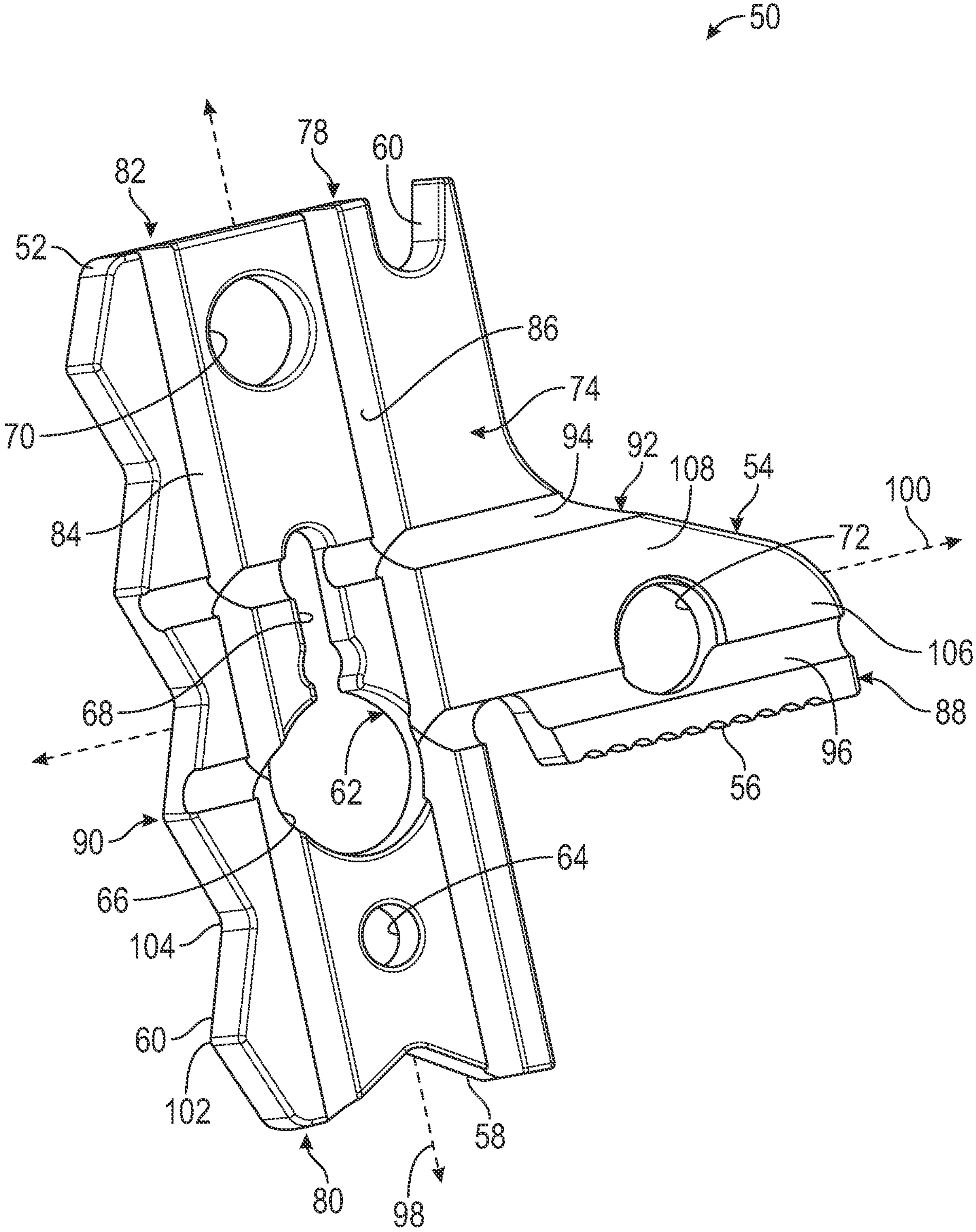
FIG. 2 is a diagrammatic view of a service accessory for a jack, according to one embodiment.
Figure 3:
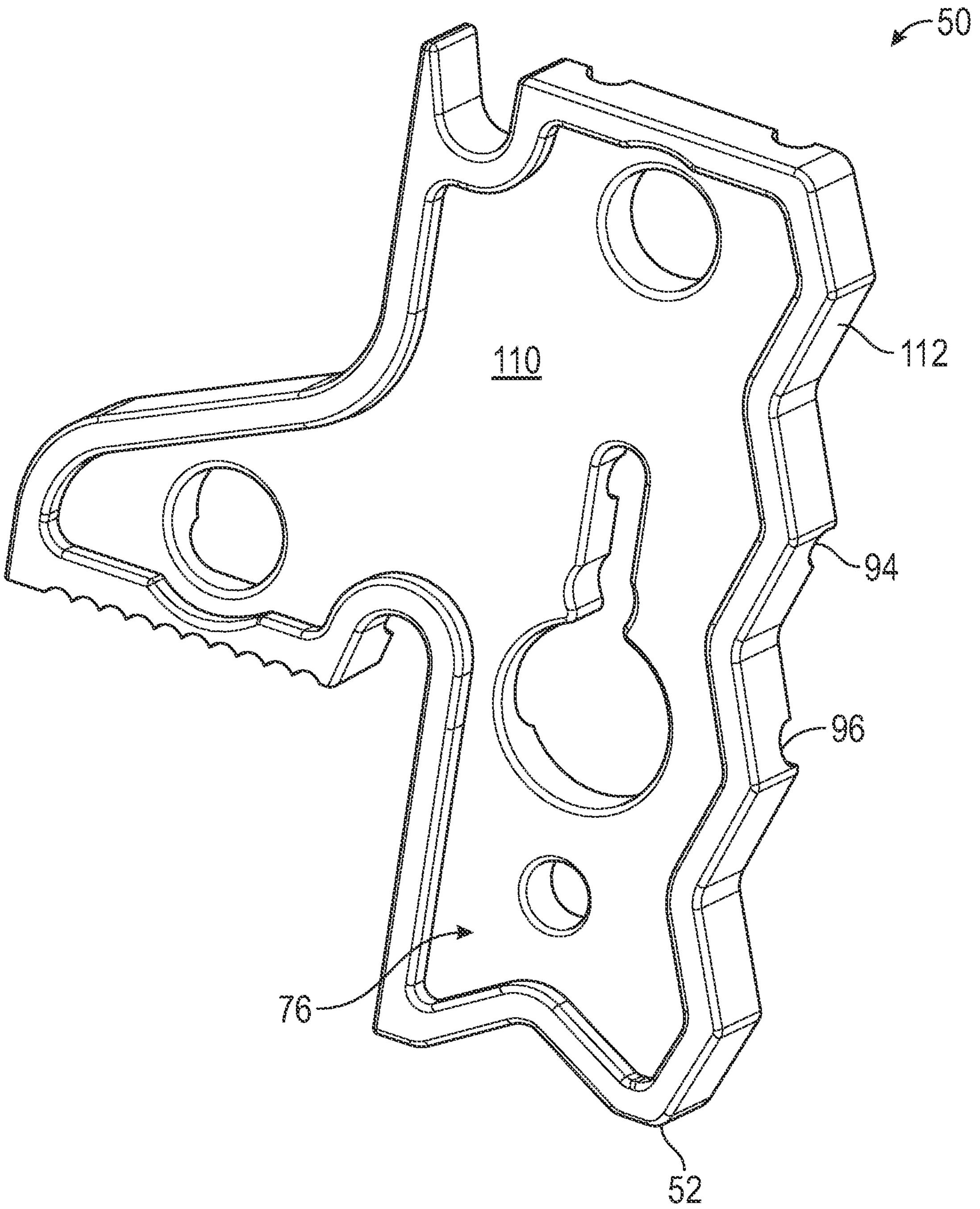
FIG. 3 is another view of the service accessory of FIG. 2.
Figure 4:
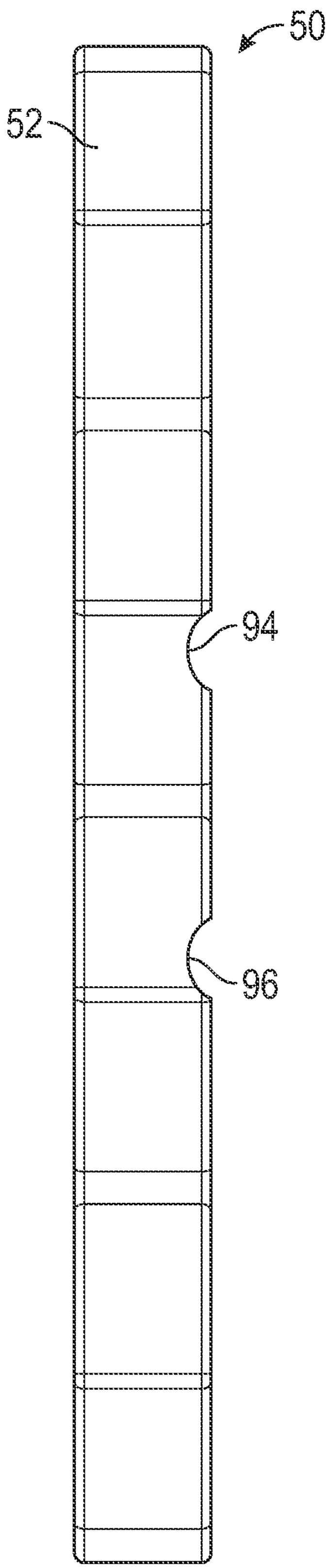
FIG. 4 is a left side view of the service accessory of FIGS. 2 and 3.
Figure 5:
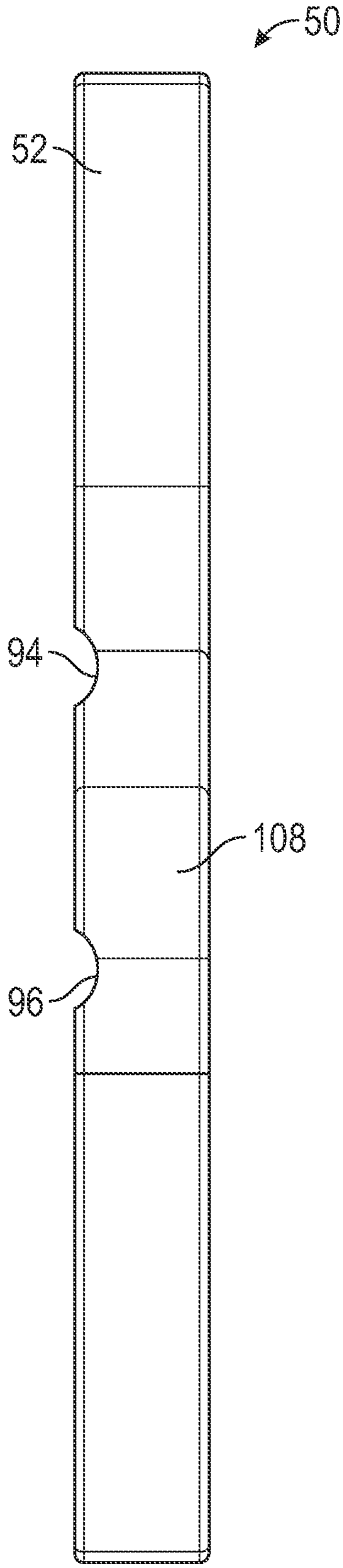
FIG. 5 is a right side view of the service accessory of FIGS. 2 and 3.

Focusing on FIG. 2, as noted above, service accessory 50 and one-piece body 52 includes first elongate guide 82 and second elongate guide 92. Each elongate guide 82 and 92 may include at least one of a channel or a rail. In the illustrated embodiment, first elongate guide 82 and second elongate guide 92 include, respectively, a first pair of parallel channels 84 and 86 and a second pair of parallel channels 94 and 96. Parallel channels 84 and 86 of first elongate guide 82 extend longitudinally in service accessory 50, and parallel channels 94 and 96 of second elongate guide 92 extend latitudinally in service accessory 50. In the illustrated embodiment the respective guides are arranged orthogonally to one another. It can also be seen from FIG. 2 that channels 84 and 86 cross and intersect channels 94 and 96 to form a cruciform pattern. As noted, at least one hole is formed in body 52 and extends from first side 74 to second side 76. The at least one hole may be formed at least partially between two guide channels 84 and 86 of first elongate guide 82 and also at least partially between two guide channels 94 and 96 of second elongate guide 92. One or more other holes may be positioned outside of both respective pairs of guide channels.

Figure 6:
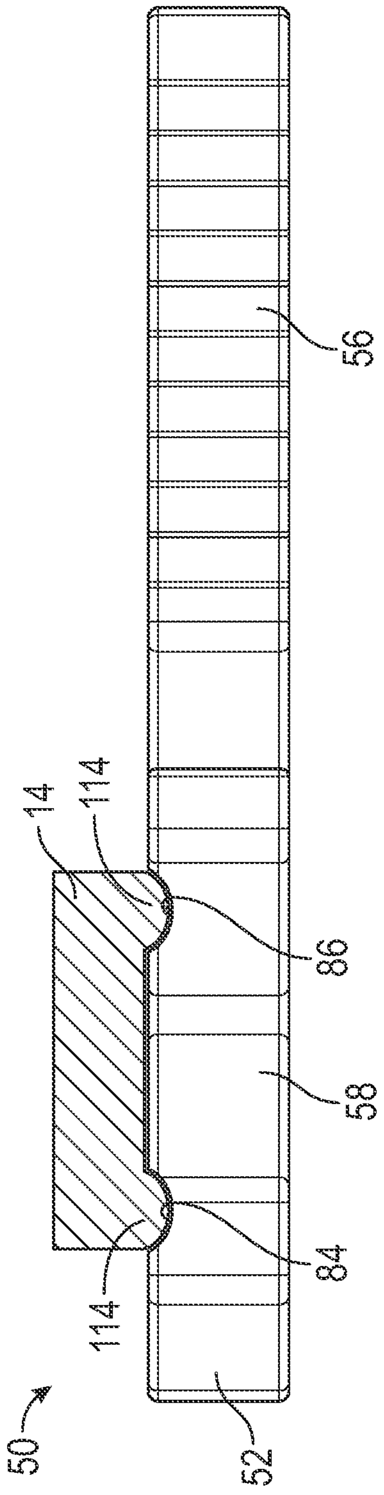
FIG. 6 is a first end view of the service accessory of FIGS. 2 and 3 shown coupled to a jack beam, according to one embodiment.
Figure 7:
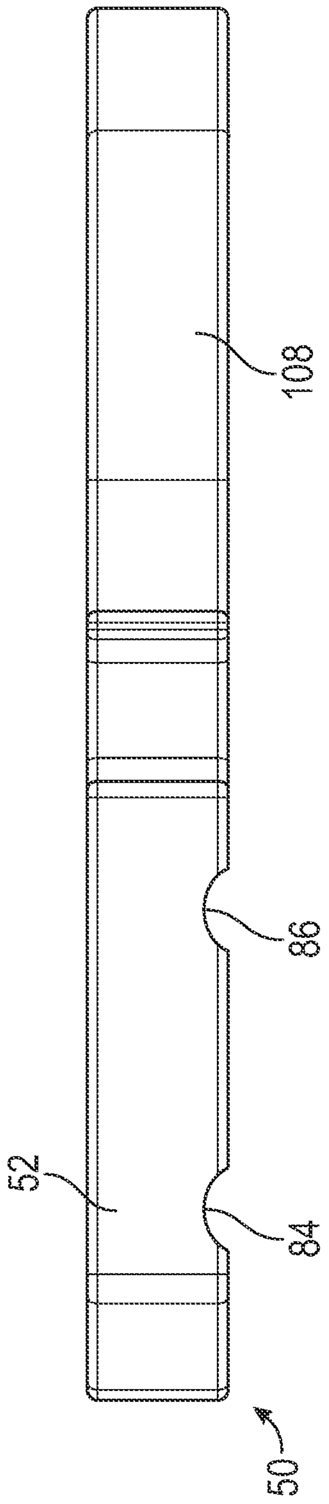
FIG. 7 is an opposite end view of the service accessory of FIGS. 2 and 3.

As can be seen from FIG. 6 a pair of rails 114 formed on beam 14 are positioned within guide channels 84 and 86. Those skilled in the art will appreciate that service accessory 50 can be rotated 90 degrees and rails 114 positioned within guide channels 94 and 96. It will be recalled fastening opening 64 extends through accessory body 52 and can receive a fastener such as a bolt or pin. A fastener 101 is shown extending through beam 14 and service accessory 50 in FIG. 1. In this way, a user can reorient service accessory 50 to position various working surfaces thereof at different orientations for service.

Those skilled in the art will also appreciate different configurations of guide channels and rails that might be implemented within the scope of the present disclosure. For example, in the illustrated embodiment first elongate guide 82 and second elongate guide 92 are both formed on first side 74. In an alternative embodiment one of guides 82 and 92 could be located upon first side 74 and the other located upon second side 76. Still other permutations could include forming guides 82 and 92 as rails protruding from first side 74 and/or second side 76 that would be received in complementary channels on beam 14. In yet another embodiment first elongate guide 82 and second elongate guide 92 might not be arranged orthogonally while still being arranged transverse to one another. Still other permutations and extensions will be apparent to those skilled in the art.

Focusing now on additional features of the various working surfaces themselves, it can be seen that accessory body 52 includes a transverse protrusion 108. Transverse protrusion may include outer working surface 56 thereon and forms a lifting nose 106. Lifting nose 106 can be used in a lifting application to vertically lift an object as well as in a spreading application or a clamping application that might not be strictly defined as lifting. Thus the term "lifting" is used in a non-limiting sense herein. Outer working surface 56 or lifting nose surface 56 may include a toothed surface in an embodiment. It can also be noted from FIG. 2 that at least one, and as illustrated in FIG. 2 two, of channels 94 and 96 are formed in part upon transverse protrusion 108.

Also in the illustrated embodiment, the plurality of inner working surfaces 66, 68, 70, 72 form at least one shackle hole. Inner working surface 70 forms a first shackle hole and inner working surface 72 forms a second shackle hole in the illustrated embodiment. Inner working surface 66 forms an opening for feeding a chain through service accessory 50 that is in communication with a chain slot formed by inner working surface 68. Chain hole 60 is intersected by channel 96 and chain slot 68 is intersected by channel 94. Outer working surface 60 forms a cutout in the illustrated embodiment as might be used to bear against an article, for example a door frame in a vehicle, for spreading, opening, or lifting.

Also in the illustrated embodiment, the plurality of outer working surfaces 56, 58, 60 may form one or more wedges including one or more wedges 102 facing the transverse direction, and one or more wedges formed by working surface 58 and facing the longitudinal direction. In the embodiment of FIG. 2 four positive wedges 102 face the transverse direction, alternating with wedge spaces or negative wedges 104. A single negative wedge is formed by working surface 58. Those skilled in the art will envision various other working surfaces and instrumentalities that might be formed upon or by outer peripheral surface 54 that enable bearing against an object, hooking through a chain, a rope, a cable, or various others.

INDUSTRIAL APPLICABILITY

Referring to the drawings generally, it will be recalled that in the first assembly configuration, some of the plurality of inner working surfaces and the plurality of outer working surfaces are presented at first service orientations relative to beam 14, whereas in the second assembly configuration some of the respective surfaces are presented at second service orientations relative to beam 14. A service orientation as contemplated herein means an orientation suitable for performing a function of jack assembly 8 including lifting, spreading, or winching for example.

In the first assembly configuration of service accessory 50 as depicted in FIG. 1, working surface 56 is in a first service orientation facing downward and suitable for clamping an object positioned between lifting nose 106 and lifting nose 46. Working surface 60 faces an opposite longitudinal direction suitable for engaging against an object for lifting or spreading. When service accessory 50 is installed in the second assembly configuration, given the examples shown rotated appropriately 90 degrees, working surface 56 and working surface 60 will not be positioned in a service orientation at all. However, in the second assembly configuration wedge surfaces 60 may be in a service orientation facing up. Still other assembly configurations could include a reversal of the arrangement shown in FIG. 1, positioning working surface 56 facing up for jacking or lifting. Some embodiments, including those shown in the attached Figures, may have a total of four different assembly configurations depending upon whether service accessory 50 is installed up or down on beam 14, or rotated, with guides 82 and 92 in each case enabling mating installation upon beam 14. Each different assembly configuration may present the various different working surfaces at different relative orientations relative to beam 14 to provide for use of jack assembly 8 in various different applications.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A jack assembly comprising:

a base;

a beam including therein a plurality of apertures spaced vertically between a first beam end coupled to the base, and a second beam end;

a runner assembly including climbing elements selectively positionable in the plurality of apertures, such that each climbing element is movable between a first position engaged in one of the plurality of apertures to secure the runner assembly in a fixed position, and a second position, and an actuator for varying a position of the runner assembly vertically upon the beam; and a service accessory defining an axis extending through the service accessory between a first side and a second side thereof, and the service accessory including a plurality of working surfaces, and a beam fastening opening formed therein;

the service accessory further including a first elongate guide structured to mate the service accessory to the beam in a first assembly configuration with the service accessory oriented at a first angular orientation about the axis and presenting a first plurality of working surfaces at first service orientations relative to the beam, and a second elongate guide structured to mate the service accessory to the beam with the service accessory rotated from the first angular orientation to a second angular orientation about the axis in a second assembly configuration presenting-a second plurality of working surfaces different than the first plurality of working surfaces at second service orientations relative to the beam;

wherein the first plurality of working surfaces and the second plurality of working surfaces includes outer working surfaces and inner working surfaces;

wherein the first elongate guide and the second elongate guide include a first pair of parallel channels and a second pair of parallel channels;

wherein the first pair of parallel channels and the second pair of parallel channels intersect.

2. The jack assembly of claim 1 wherein the first elongate guide extends longitudinally in the service accessory, and the second elongate guide extends latitudinally in the service accessory.

3. The jack assembly of claim 1 wherein the first pair of parallel channels and the second pair of parallel channels are arranged orthogonally to one another.

4. The jack assembly of claim 1 wherein the outer working surfaces include at least one of a lifting nose surface or a wedge surface.

5. The jack assembly of claim 4 wherein the inner working surfaces form at least one of a shackle hole or a chain slot.

6. A service accessory for a jack comprising:
- a one-piece accessory body having an outer peripheral surface varied in contour so as to form a plurality of outer working surfaces, and at least one inner peripheral surface forming a beam fastening opening and a plurality of inner working surfaces;
- the one-piece accessory body further including a first longitudinal end, a second longitudinal end, and a first elongate guide extending longitudinally from a first longitudinal terminal end located at the first longitudinal end to a second longitudinal terminal end located at the second longitudinal end;
- the one-piece accessory body further including a first transverse end, a second transverse end, and a second elongate guide extending transversely between the first transverse end and the second transverse end;
- the plurality of inner working surfaces having a distribution in at least one of a longitudinal direction or a transverse direction, and the plurality of outer working surfaces among them defining at least one service orientation in the longitudinal direction and at least one service orientation in the transverse direction; and
- wherein each of the first elongate guide and the second elongate guide includes a set of respectively parallel channels.

7. The service accessory of claim 6 wherein the plurality of outer working surfaces includes a first wedge surface facing the longitudinal direction, and a second wedge surface facing the transverse direction.

8. The service accessory of claim 7 wherein the second wedge surface is one of a plurality of wedge surfaces facing the transverse direction.

9. The service accessory of claim 6 wherein the plurality of inner working surfaces form at least one shackle hole.

10. The service accessory of claim 6 wherein the one-piece accessory body includes a lifting nose, and the plurality of outer working surfaces includes a lifting nose surface upon the lifting nose.

11. The service accessory of claim 6 wherein the one piece accessory body includes a transverse protrusion forming the lifting nose, and at least one channel of the second elongate guide is formed in part upon the transverse protrusion.

12. A service accessory for a jack comprising:
- an accessory body having a first longitudinal end, a second longitudinal end, a first transverse end, a second transverse end, a first side, a second side, and at least one hole extending through the accessory body from the first side to the second side;
- the accessory body further including a first outer working surface defining a service orientation in a longitudinal direction, and a second outer working surface defining a service orientation in a transverse direction; and
- the accessory body further including a longitudinal set of guide channels formed in one of the first side or the second side and a transverse set of guide channels formed in one of the first side or the second side;
- wherein the transverse direction includes a latitudinal direction, and the longitudinal set of guide channels and the transverse set of guide channels are each formed on the first side; and
- wherein the longitudinal set of guide channels intersects the transverse set of guide channels in a cruciform pattern.

13. The service accessory of claim 12 wherein the at least one hole is formed at least partially between two guide channels of the longitudinal set of guide channels and at least partially between two guide channels of the transverse set of guide channels.

* * * * *